United States Patent
Suzuki (10) Patent No.: US 7,099,030 B2
(45) Date of Patent: Aug. 29, 2006

(54) IMAGE COMMUNICATIONS SYSTEM

(75) Inventor: Minoru Suzuki, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 959 days.

(21) Appl. No.: 10/022,857

(22) Filed: Dec. 20, 2001

(65) Prior Publication Data

US 2003/0117662 A1    Jun. 26, 2003

(51) Int. Cl.
*H04N 1/00* (2006.01)
*G06K 9/36* (2006.01)

(52) U.S. Cl. ............. 358/1.15; 358/434; 382/232
(58) Field of Classification Search ....... 358/1.15, 358/402, 403, 407, 425, 426.12, 426.16, 358/434, 468; 382/232, 244, 246, 248
See application file for complete search history.

(56) References Cited

U.S. PATENT DOCUMENTS 6,157,463 A * 12/2000 Kitagawa .......... 358/400
6,288,799 B1 * 9/2001 Sekiguchi ......... 358/468
2001/0033390 A1 * 10/2001 Tonegawa ........ 358/1.15
2002/0080414 A1 * 6/2002 Tanimoto .......... 358/402

FOREIGN PATENT DOCUMENTS

| JP | 11298707 | 10/1999 |
| JP | 125070 | 4/2000 |
| JP | 354128 | 12/2000 |

* cited by examiner

*Primary Examiner*—Joseph R. Pokrzywa
(74) *Attorney, Agent, or Firm*—Foley & Lardner LLP (57) ABSTRACT

A communications system receives fax image data encoded with a specific facsimile data format and carrying transmission codes having no relation with image contents, converts the received fax image data into Internet-fax data in a specific format, and transfers the Internet-fax data to an Internet terminal as an in-system terminal. The communications system includes a receiver to receive the fax image data supplied via a regular communications network, a comparator to compare an encoding mode for the received fax image data and an encoding mode for the Internet-fax data for the Internet terminal, a converter to add format data for the Internet-fax data to the fax image data with no decoding of the fax image data if there is a match in the comparison, for converting the format data-added fax image data into the Internet fax data, and a transmitter to transmit the converted Internet fax data to the Internet terminal.

19 Claims, 10 Drawing Sheets

IMAGE COMMUNICATIONS SYSTEM

BACKGROUND OF THE INVENTION

The present invention relates to video communications system for transferring image data sent in a G3-compatible fax transmission mode to fax machines connected to the Internet. Such G3-mode video data are transmitted with encoding techniques, for example, modified Huffman (abbreviated to MH hereinafter) encoding, modified READ (Relative Element Address Designate) (abbreviated to MR hereinafter) encoding, modified-modified READ (abbreviated to MMR hereinafter) encoding, and joint bi-level image experts group (abbreviated to JBIG hereinafter) encoding.

The G-interface standards is the standards for facsimiles, decided in G-series recommendation made by ITU-T (International Telecommunication Union-Telecommunication Standardization Sector/former CCITT). This fax standards is used for fax communications via regular telephone lines. The G-interface standards offers several transmission modes such as G1, G2 and G3 modes depending on image-transmission time. The most popular at present is the G3 mode using code-redundancy compression, bandwidth compression etc. Image-data encoding techniques available for G3 mode are HM, MR, MMR, JBIG, etc., listed above.

The MH encoding is one of compression encoding techniques for facsimiles in which image data is processed per scanning line using distribution information such as "A specific number of black exist". The MR encoding is also called a border-difference sequential encoding technique, superior to the MH encoding on compression ratio. It is a two-dimensional encoding technique using correlation between scanning lines in the vertical direction, which may be correspond to an enhanced one-dimensional encoding technique. The READ encoding is a combination of RAC (Relative Address Coding) and EDIC (Edge Difference Coding) using their advantages. The JBIG encoding is the international standards for still-picture encoding techniques in which users can retrieve desired images from an image database and display them on monitor screen. This encoding technique achieves so called hierarchical transmission in which grainy images are transferred first, followed by gradually clean images, using the Markov encoding technique.

Internet fax machines have also been proposed in accordance with recent rapid development of computers. This type of machine is capable of transmitting image data via the Internet to a computer so that the data can be displayed on the computer screen or printed out by a printer connected to the computer. One of the standard image-file formats for Internet fax machines is TIFF (Tag Image File Format) in which the attribute of image data is defined for example with a tag information. This TIFF format allows data-type identification with a several-hundred-byte standard tag information stated in the head of an image file. Several types of flags for different image-data types are available for the tag information.

Figure 9:
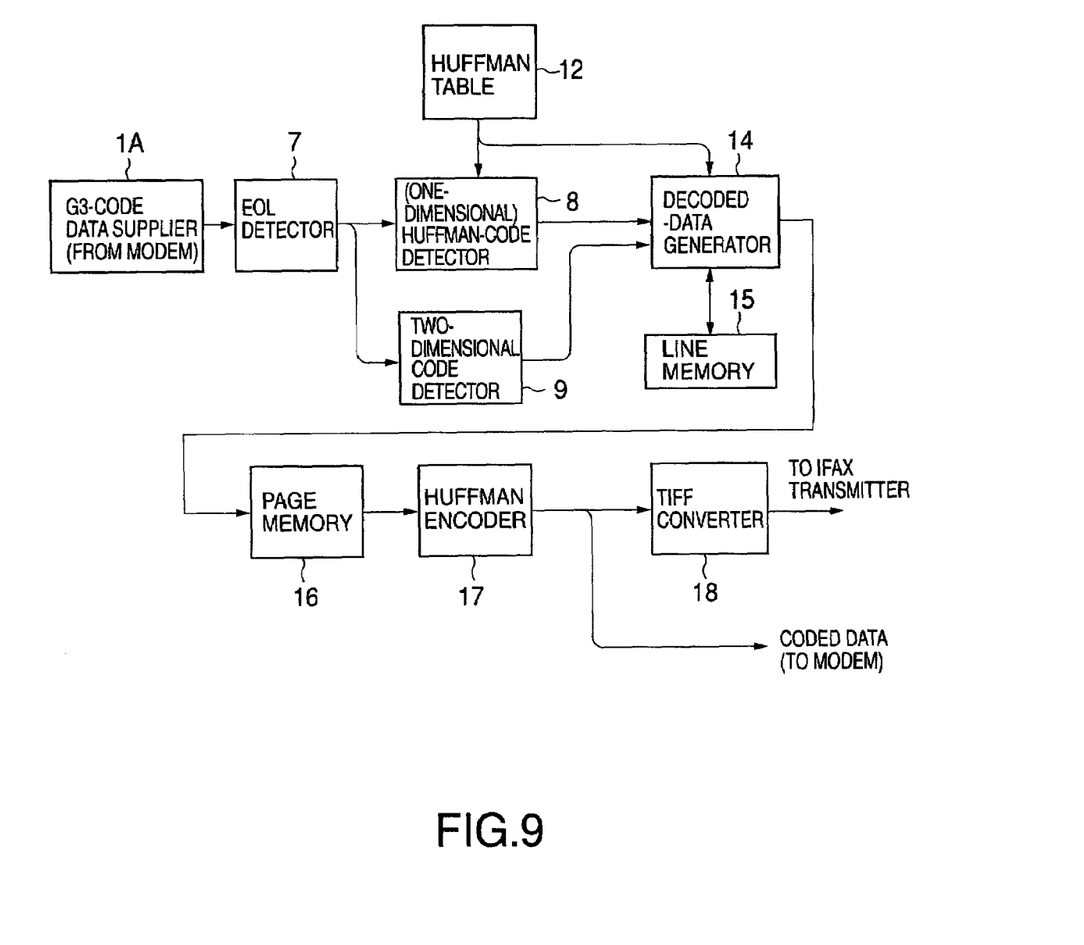
FIG. 9 shows a block diagram of a known system.
Figure 10:
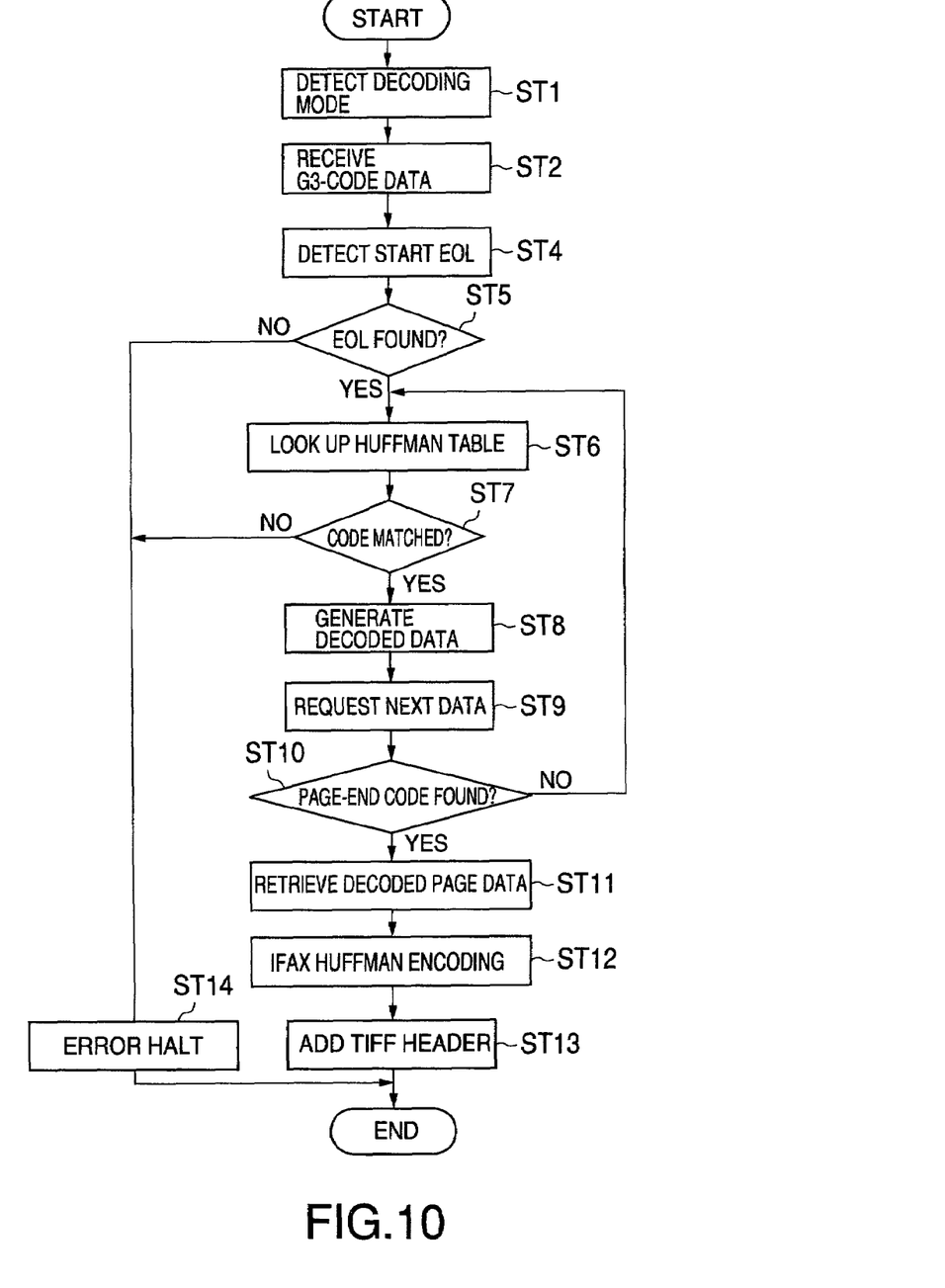
FIG. 10 shows a flowchart indicating a data-processing flow for the known system.

A known Internet fax machine is explained with reference FIGS. 9 and 10. Shown in FIG. 9 is a basic block diagram of the known Internet fax machine. The Internet fax machine is equipped with a G3-code data supplier 1A for supplying G3-compatible fax image data, an EOL detector 7 for detecting an EOL that indicates a segment between lines in code data, one-dimensional Huffman-code detector 8 and a two-dimensional code detector 9 for detecting one- and two-dimensional codes, respectively, a Huffman table 12 for storing Huffman codes, a decoded-data generator 14 for generating decoded data based on the outputs of the one- and two-dimensional code detectors 8 and 9, a line memory 15 for storing the decoded data per line, a page memory 16 for storing the decoded data per page, a Huffman encoder 17 for generating code data corresponding to a code mode used for an internal Internet terminal, and a TIFF converter 18 for adding TIFF code such as a header for Internet facsimile to the generated code data.

The operation of the known Internet fax machine in FIG. 9 is explained with reference to the flowchart shown in FIG. 10. A decoding mode is detected in step ST1 and G3-compatible fax image data is received instep ST2. A start EOL is detected by the EOL detector 7 (step ST4), and it is determined whether the EOL has been found (step ST5). If found, the Huffman table 12 is looked up (step ST6), and it is determined whether there is a match on codes between the received fax image data and the Huffman table 12 (step ST7). If there is a match, decoded data is generated (step ST8) and the next data is requested (step ST9). It is determined instep ST10 whether a page-end code has been found. If found, the decoded page data is stored in the page memory 16.

The decoded page data is retrieved from the page memory 16 (step ST11) and sent to the Huffman encoder 17 for generation of Huffman code data for Internet facsimile (step ST12). Lastly, a TIFF header such as a header used in the Internet is added to the Huffman code data (step ST13). On the contrary, the procedure is brought to an error halt (step ST14) if no EOL has been found in step ST5 or no code has been found on the Huffman table, that should match the fax image data received in step ST7. Moreover, if no page-end code has been found in step ST10, the steps from ST6 to ST10 are repeated until a page-end code is found.

Transfer of image data received in a G3-compatible fax mode such as the above several types of encoding modes to another terminal via Internet facsimile requires decoding of the received image data such as MR-code image data to generate decoded image data and then re-encoding of the decoded image data into TIFF image data for Internet facsimile. This data transfer technique gives a heavy load to an image communications system for transferring imaged data received via a regular telephone line, etc., to another terminal in the communications system.

Moreover, most image data received in a G3-compatible fax mode such as MH-code mode and MR-code mode carry fill bits per line. The fill bits are stuff bits for indicating image data on one line as one-line data if the data on one line is less than the minimum line-transfer data amount for a constant one-line image-data transmission time beyond a specific time. The one-line image-data transmission time is for example about 2 seconds minimum. A standard fill-bit stuffing capacity corresponds to 5 seconds maximum.

Such fill bits are usually deleted from data for Internet facsimile when coded image data received via a regular telephone line is decoded and then re-encoded as Internet-fax data. However, if the image data is used as another type of fax data, the fill bits have to be reconverted even though they are unnecessary data for Internet-fax data.

Moreover, there is a situation in which a G3-compatible fax mode, for transferring image data to Internet facsimile which has been encoded in a specific encoding technique and transmitted from a usual facsimile, corresponds to image-data format handled by Internet facsimile. A header data such as a tag is then added to the image data received in the G3-compatible fax mode to form a TIFF-format data to be transmitted to another terminal, for such situation. This also requires transfer of fill bits unnecessary for Internet-fax image data in an image communications system. Such fill-bit transfer causes low transfer efficiency due to transfer of data unnecessary for skipping overhead or unnecessary procedures such as decoding/encoding in the same mode.

SUMMARY OF THE INVENTION

A purpose of the present invention is to provide an image communications system with a small load on data conversion by decoding/encoding between a G3-mode fax image data and an Internet-fax image data with different encoding modes, which achieves high transfer efficiency with less file capacity by way of deleting at least data with no relation to data contents, such as fill bits, from a G3-mode fax image data carrying the fill bits.

In order to fulfill the purpose, an image communications system, according to a first basic aspect of the present invention, for receiving fax image data encoded with a specific facsimile data format and carrying transmission codes having no relation with image contents, converting the received fax image data into Internet-fax data in a specific format, and transferring the Internet-fax data to an Internet terminal as an in-system terminal, includes: a receiver to receive the fax image data supplied via a regular communications network; a comparator to compare an encoding mode for the received fax image data and an encoding mode for the Internet-fax data for the Internet terminal; a converter to add format data for the Internet-fax data to the fax image data with no decoding of the fax image data if there is a match in the comparison, for converting the format data-added fax image data into the Internet fax data; and a transmitter to transmit the converted Internet fax data to the Internet terminal.

In the image communications system according to the first basic aspect of the present invention, the image communications system may be a first sub-aspect of the invention, wherein the comparator includes: a mode comparator to compare the encoding mode for the received fax image data and an encoding mode for the Internet-fax data to be used at the in-system Internet terminal; a detector to detect whether or not there is a match between the encoding mode for the received fax image data and the encoding mode for the Internet-fax data; and a data switch to output the fax image data to the converter if there is a match in a comparison result at the detector whereas to output the Internet-fax image data generated in the system to the converter if there is no match.

In the image communications system according to the first sub-basic aspect of the invention, the image communications system may be a second sub-aspect of the invention, wherein the image communications system further includes a code detector to detect codes of the fax image data supplied via the code comparator of the comparator, the code detector having: a line-segment detector to detect a segment of the fax image data per line; and a one- and two-dimensional code detector to compare the segment detected fax image data with Huffman codes on a Huffman table, for one- and two-dimensionally detecting Huffman codes of the segment-detected fax image data.

In the image communications system according to the second sub-basic aspect of the invention, the image communications system may further include: a decoder to decode the segment-detected fax image data with Huffman codes stored on the Huffman table corresponding to an output of the one- and two-dimensional code detector, for generating the Internet-fax data in the system; and an encoder to encode the decoded fax image data in the encoding mode for the in-system Internet terminal, wherein the decoder includes the Huffman table and a decoding executer having a decoded-data generator to generate decoded data per line with Huffman codes, on the Huffman table, corresponding to the output of the one- and two-dimensional code detector and a line memory to store the data decoded per line, a page memory being interposed between the decoder and the encoder, the page memory storing, per page, the decoded data output from the decoder and supplying the decoded data per page to the encoder.

In the image communications system according to the first sub-basic aspect of the invention, the converter may include an Internet-fax data generator to output the fax image data to the converter if there is a match at the detector of the comparator between the encoding mode for the received fax image data and the encoding mode for the Internet-fax data whereas, if there is no match, add format data for the Internet-fax data to data output from the data switch, the output data carrying image contents for Internet facsimile.

In the image communications system according to the first sub-basic aspect of the invention, the comparator may include: a supplier to supply a comparison result of comparing an encoding mode for fax image data supplied from a modem and an encoding mode for in-system Internet-fax data to the converter; and a switch to switch G3-compatible code data supplied from the modem and Internet-fax image data encoded for an in-system terminal, having an input terminal for receiving the fax image data, another input terminal for receiving the Internet-fax image data, and a movable contact for switching the data at the two input terminals based on a result of the mode comparison, and the converter includes a TIFF converter, in response to either the fax image data or the Internet-fax image data switched by the switch, to add TIFF data that is format data for the Internet-fax data to either the fax image data or the Internet-fax image data, thus generating the Internet-fax data.

In the image communications system according to the first sub-basic aspect of the invention, the image communications system may be a third sub-basic aspect of the invention, wherein the comparator includes: a mode comparator to compare the encoding mode for the received fax image data and an encoding mode for the Internet-fax data to be used at the in-system Internet terminal; a detector to detect whether or not there is a match between the encoding mode for the received fax image data and the encoding mode for the Internet-fax data; and a data switch to output the fax image data to the converter if there is a match in a comparison result at the detector whereas to output the Internet-fax image data generated in the system to the converter if there is no match, the system further comprises a code detector to detect codes of the fax image data supplied via the code comparator of the comparator, the code detector including: a line-segment detector to detect a segment of the fax image data per line; and a one- and two-dimensional code detector to compare the segment-detected fax image data with Huffman codes on a Huffman table, for one- and two-dimensionally detecting Huffman codes of the segment-detected fax image data, the system further comprises a specific-code deleter to detect and delete a specific code added to the fax image data for smooth transmission via facsimile, the specific code having no direct relation with images, for outputting specific code-deleted fax image data, and the data switch of the comparator selects the fax image data supplied from the receiver, the internet-fax image data encoded in the encoding mode for the in-system Internet terminal or the specific code-deleted fax image data output from the specific-code deleter, the selected image data being output to the converter.

In the image communications system according to the third sub-basic aspect of the invention, the image communications system may further include: a decoder to decode the segment-detected fax image data with Huffman codes stored on the Huffman table corresponding to an output of the one- and two-dimensional code detector, for generating the Internet-fax data in the system; and an encoder to encode the decoded fax image data in the encoding mode for the in-system Internet terminal, wherein the decoder includes the Huffman table and a decoding executer having a decoded-data generator to generate decoded data per line with Huffman codes, on the Huffman table, corresponding to the output of the one- and two-dimensional code detector and a line memory to store the data decoded per line, a page memory being interposed between the decoder and the encoder, the page memory storing, per page, the decoded data output from the decoder and supplying the decoded data per page to the encoder.

In the image communications system according to the third sub-basic aspect of the invention, the converter may include an Internet-fax data generator to output the fax image data to the converter if there is a match at the detector of the comparator between the encoding mode for the received fax image data and the encoding mode for the Internet-fax data whereas, if there is no match, adding format data for the Internet-fax data to data output from the data switch, the output data carrying image contents for Internet facsimile.

In the image communications system according to the third sub-basic aspect of the invention, the comparator may include: a supplier to supply a comparison result of comparing an encoding mode for fax image data supplied from a modem and an encoding mode for in-system Internet-fax data to the converter; and a switch to switch G3-compatible code data supplied from the modem and Internet-fax image data encoded for an in-system terminal, having an input terminal for receiving the fax image data, another input terminal for receiving the Internet-fax image data, and a movable contact for switching the data at the two input terminals based on a result of the mode comparison, and the converter includes a TIFF converter, in response to either the fax image data or the Internet-fax image data switched by the switch, to add TIFF data that is format data for the Internet-fax data to either the fax image data or the Internet-fax image data, thus generating the Internet-fax data.

In the image communications system according to the third sub-basic aspect of the invention, the image communications system may be a fourth sub-basic aspect of the invention, wherein the fax image data has been encoded by a G3-mode compatible encoding technique.

In the image communications system according to the fourth sub-basic aspect of the invention, the specific code having no relation with image contents may be fill bits that have been added to the encoded data per line, depending on necessity.

In the image communications system according to the fourth sub-basic aspect of the invention, the G3-mode compatible encoding technique may be modified Huffman (MH) encoding, modified READ (MR) encoding, modified-modified READ (MMR) encoding or joint bi-level image experts group (JBIG) encoding.

In the image communications system according to the fourth sub-basic aspect of the invention, the format data for the Internet-fax data may include data in a tag image file format (TIFF) that defines an attribute of the image data with information including a tag.

An image communications system, according to a second basic aspect of the present invention, for receiving fax image data encoded with a specific facsimile data format and carrying transmission codes having no relation with image contents, converting the received fax image data into Internet-fax data in a specific format, and transferring the Internet-fax data to an Internet terminal as an in-system terminal, includes: a receiver to receive the fax image data supplied via a regular communications network; a comparator to compare an encoding mode for the received fax image data and an encoding mode for the Internet-fax data for the Internet terminal; a code detector, based on the encoded data for which the encoding mode has been compared, to detect a specific code from a specific encode data, the specific code having no relation with image contents, and delete the detected specific code with no decoding of another code; and a converter to add format data for the Internet-fax data to the fax image data with no decoding of the fax image data if there is a match in the comparison, for converting the format data-added fax image data into the Internet fax data; and a transmitter to transmit the converted Internet fax data to the Internet terminal.

The image communications system according to the second basic aspect of the invention may further include a code detector to detect codes of the fax image data supplied via the code comparator of the comparator, the code detector having: a line-segment detector to detect a segment of the fax image data per line; a one- and two-dimensional code detector to compare the segment-detected fax image data with Huffman codes on a Huffman table, for one- and two-dimensionally detecting Huffman codes of the segment-detected fax image data; and a specific-code deleter, based on outputs of the one- and two-dimensional code detector, to detect and delete a specific code added to the fax image data for smooth transmission via facsimile, the specific code having no direct relation with images, for outputting specific code-deleted fax image data, and the comparator including a supplier to supply a comparison result of comparing an encoding mode for fax image data supplied from a modem and an encoding mode for in-system Internet-fax data to the converter; and a switch to switch G3-compatible code data supplied from the modem and Internet-fax image data encoded for an in-system terminal, having an input terminal for receiving the fax image data, another input terminal for receiving the Internet-fax image data, and a movable contact for switching the data at the two input terminals based on a result of the mode comparison, and the converter including a TIFF converter, in response to either the fax image data or the Internet-fax image data switched by the switch, to add TIFF data that is format data for the Internet-fax data to either the fax image data or the Internet-fax image data, thus generating the Internet-fax data.

In the image communications system according to the second basic aspect of the invention, the image communications system may be a fifth sub-aspect of the invention, wherein the fax image data has been encoded by a G3-mode compatible encoding technique.

In the image communications system according to the fifth sub-aspect of the invention, the G3-mode compatible encoding technique may be modified Huffman (MH) encoding, modified READ (MR) encoding, modified-modified READ (MMR) encoding or joint bi-level image experts group (JBIG) encoding.

In the image communications system according to the fifth sub-aspect of the invention, the fax image data encoded by the G3-mode compatible encoding technique may include at least one EOL code, data related to the image contents and fill-bit data.

In the image communications system according to the fifth sub-aspect of the invention, the format data for the Internet-fax data may include data in a tag image file format (TIFF) that defines an attribute of the image data with information including a tag.

DETAILED DESCRIPTION OF PREFERRED EMBODIMENTS

Preferred embodiments according to the present invention will be disclosed with reference to the attached drawings.

Figure 1:
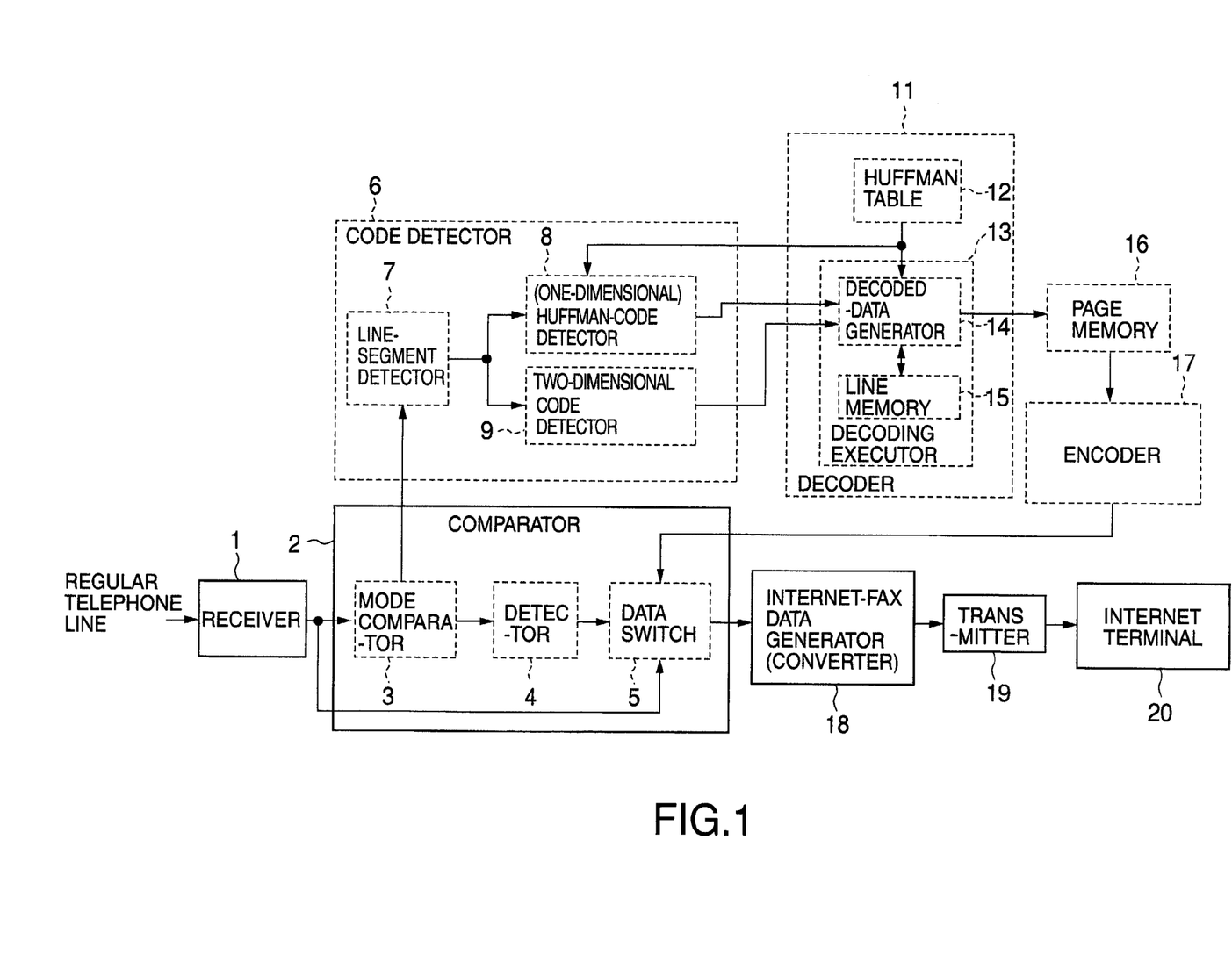
FIG. 1 shows a block diagram of a first embodiment of an image communications system, the basic conception of the present invention.

FIG. 1 shows a block diagram of a first embodiment of an image communications system, the basic conception of the present invention. The image communications system according to the first embodiment is to receive a fax image data carrying transmission codes with no relation to the image contents, that has been encoded in a specific facsimile-data format, convert the fax image data into an Internet-fax data in a specific format and transfer it to an Internet terminal 20, an in-system terminal.

The image communications system according to the first embodiment shown in FIG. 1 is equipped with a receiver 1, such as a modem, for receiving the fax image data transmitted via a regular telephone line, a comparator 2 for comparing the fax image data and the Internet-fax data used at the Internet terminal 20 on their encoding modes, an Internet-fax data generator 18 that is a converter for converting the fax image data into the Internet-fax data with addition of format data to be used for the Internet-fax data to the fax image data with no decoding, and a transmitter 19 for transmitting the generated Internet-fax data to the Internet terminal 20.

A further detailed architecture will be disclosed more in detail with reference to FIG. 1. The comparator 2 is equipped with a mode comparator 3 for comparing an encoding mode for the fax image data supplied from the receiver 1, such as G3-code data, with an encoding mode for the internal Internet terminal 20 provided in this image communications system, a detector 4 for detecting whether there is a match between both encoding modes in accordance with the comparison result, and a data switch 5 for selecting either the fax image data supplied from the receiver 1 or an Internet-fax data that has been subjected to usual decoding/encoding, in accordance with the detection result.

When there is no match between the encoding modes for the fax image data and that for the internal terminal in accordance with the detection result of the mode comparator 3, the fax image data is converted into the Internet-fax data through usual decoding/encoding. In detail, the fax image data is sent to a line-segment detector 7 for detecting codes indicating data-start and -end per line for the fax image data. The code-start/end-detected fax image data is supplied to a one-dimensional Huffman-code detector 8 for detecting Huffman codes using those retrieved from a Huffman table 12. It is also supplied to a two-dimensional code detector 9 for detecting two-dimensional codes. A pre-decoding procedure is then completed.

An actual decoding procedure is performed in a decoding apparatus 11 with the Huffman table 12 and a decoding executor 13. The outputs of the one- and the two-dimensional code detectors 8 and 9 are decoded per line by a decoded-data generator 14. The decoded data are stored in a line memory 15. Stored one-page decoded data are output and stored in a page memory 16.

Disclosed next is a procedure of generating Internet-fax data. The one-page decoded data stored in the page memory 16 are re-encoded by an encoder 17 in an encoding mode the same as that for the internal Internet terminal 20. The Internet-fax data encoded by the encoder 17 is sent to the data switch 5 of the comparator 2.

Fill bits explained above are usually deleted in general decoding/encoding. In contrast, the first embodiment does not necessarily delete specific codes such as fill bits which may be deleted from the Internet-fax data.

Figure 2:
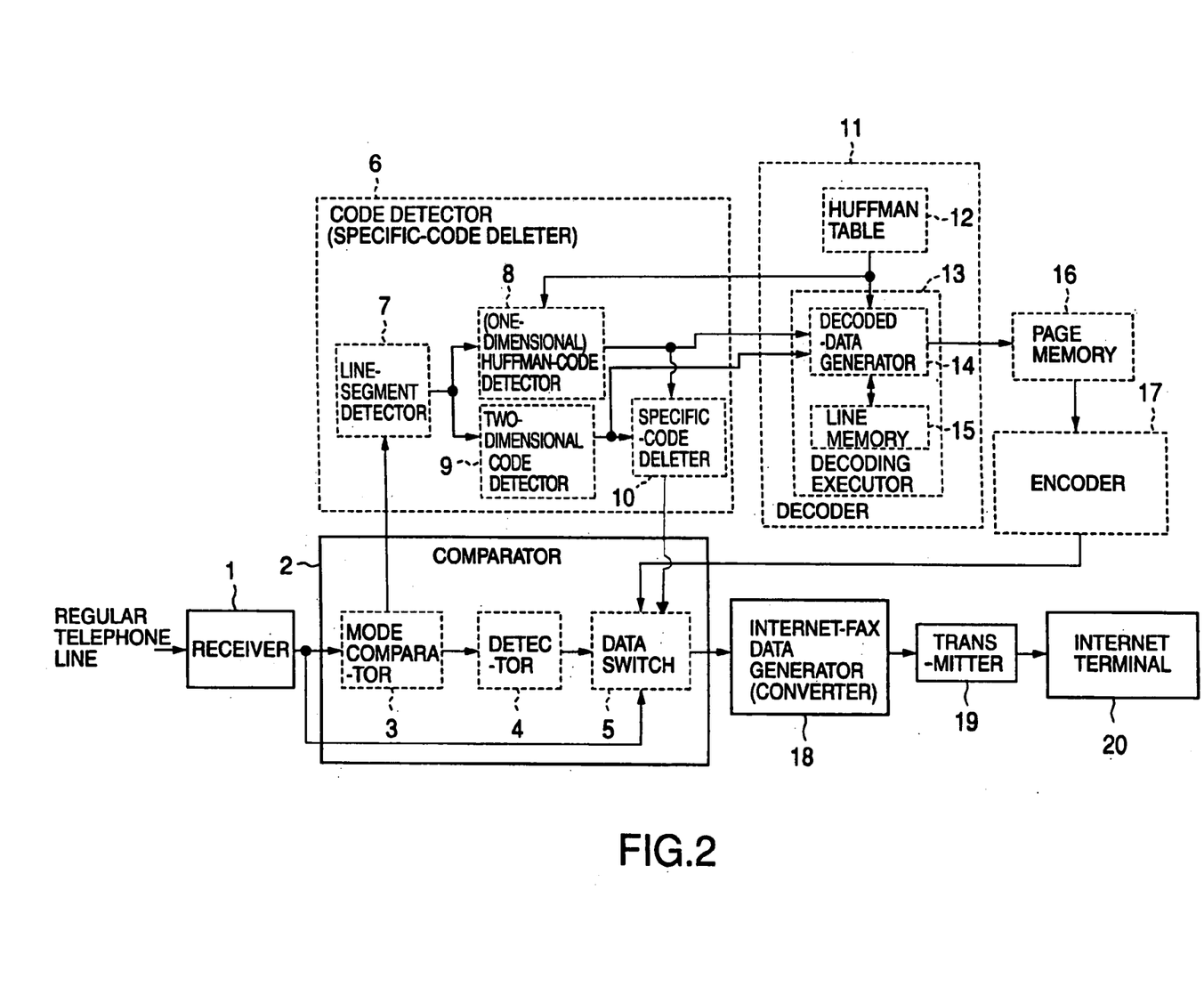
FIG. 2 shows a block diagram of a second embodiment of an image communications system according to the present invention.

On the contrary, in an image communications system according to a second embodiment shown in FIG. 2, a code detector 6 detects an encoding mode and always delete specific codes such as fill bits. The code detector 6 for performing a pre-decoding procedure is equipped with a specific-code deleter 10 for deleting a specific code such as fill bits peculiar to fax image data. The code detector 6 then functions as a specific-code deleter.

A coded fax image data from which a specific code such as fill bits has been deleted by the specific-code deleter 10 is output to a data switch 5 of a comparator 2. In detail, data supplied to the data switch 5 in the second embodiment are a fax image data received via a receiver 1, a coded fax image data from which a specific code such as fill bits has been deleted by the specific-code deleter 10 of the code detector 6, and data encoded by an encoder for Internet facsimile. These three data are switched to be output to an Internet-fax data generator 18 in accordance with the detection of the detector 4 based on a comparison result at a mode comparator 3 of a comparator 2.

In detail, assumed is a first state in which an encoding mode for the received fax image data and another encoding mode for Internet-fax data handled by an internal Internet terminal 20 are the same as each other. In this state, the data switch 5 selects the fax image data received via the receiver 1 and sends it to the Internet-fax data generator 18 to avoid redundant decoding and encoding procedures (so called overhead). The Internet-fax data generator 18 adds TIFF to the fax image data sent from the receiver 1 via the comparator 2 and outputs the TIFF-added fax image data as Internet-fax image data.

Still, in the first state, but a second state is assumed in which a transmitter 19 requires a high transmission efficiency. In the second state, the data switch 5 selects the fax image data, from which a specific code such as fill bits has been deleted, output from the specific-code deleter 10, and sends it to the Internet-fax data generator 18 for two purposes of improving transmission efficiency and avoiding redundant decoding and encoding procedures. It is achieved that data, from which a specific code such as fill bits having no relation with the image data has been deleted, can be supplied to an Internet fax machine.

Assumed lastly is a third state in which an encoding mode for the received fax image data and another encoding mode for Internet-fax data handled by the internal Internet terminal 20 are different from each other. The third state requires the following procedures: The fax image data is decoded by a decoder 11 and stored in a page memory 16 per page. The stored data is encoded by an encoder 17 in an encoding mode the same as that for the internal Internet terminal 20. The encoder 17 will not add specific code such as fill bits to the Internet-fax data, thus data-file amount being drastically decreased.

Figure 3:
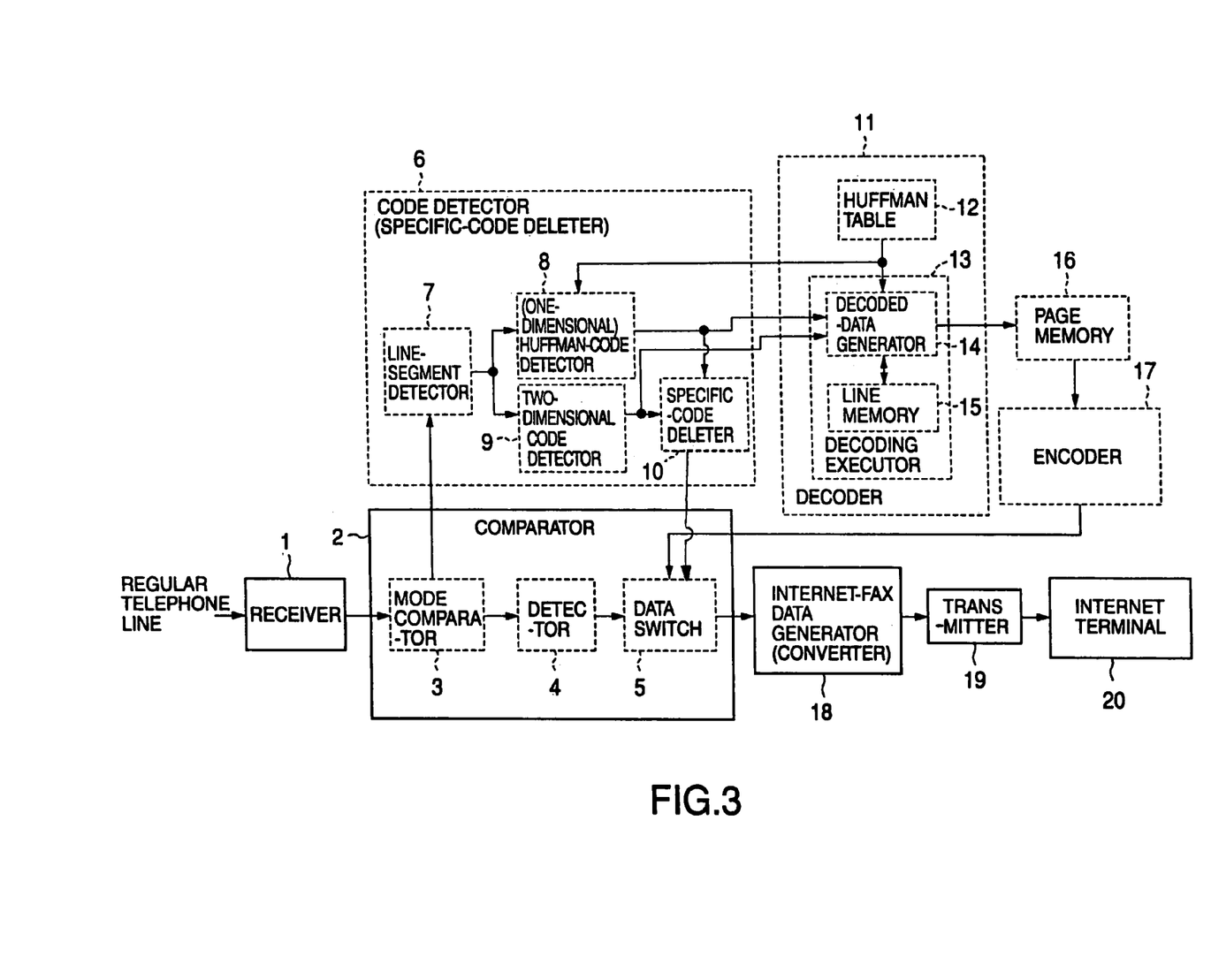
FIG. 3 shows a block diagram of a third embodiment of an image communications system according to the present invention.

A third embodiment of an image communications system shown in FIG. 3 is an improvement on the second embodiment for higher transmission efficiency. The third embodiment of the image communications system shown in FIG. 3 corresponds to the counterpart in the second-embodiment shown in FIG. 3, except that the former does not have a supply line, such as shown in FIG. 2, for supplying fax image data received via the receiver 1 to the data switch 5. This arrangement implies that the third embodiment will not handle fax image data with codes such as TIFF for Internet facsimile, or fax image data with specific codes such as fill bits that remain undeleted.

The image communications system according to the third embodiment processes data at its respective stages as follows: All fax image data received via the receiver 1 are subjected to deletion of specific codes such as fill bits. Data to be supplied to the data switch 5 from the specific-code deleter 10 are not subjected to decoding. In contrast, data supplied to the data switch 5 from the encoder 17 are once decoded and then encoded again in the encoding mode for an Internet fax machine, thus these data do not carry any specific codes such as fill bits as data for communications via the Internet.

The difference between the third embodiment of the image communications system shown in FIG. 3 and the second-embodiment of the counterpart shown in FIG. 3 is that the former does not have a supply line, such as shown in FIG. 2, for supplying fax image data received via the receiver 1 to the data switch 5. In other words, in the third embodiment of the image communications system, data to be selected by the data switch 5 and supplied to the Internet-fax data generator 18 are either of two types. One type is the fax image data encoded in the received encoding mode, from which specific codes such as fill bits have been deleted with no decoding procedure. The other type is the image data that have been decoded by the decoder 11 and encoded again by the encoder 17 in the encoding mode for an Internet fax machine as an internal terminal.

When an encoding mode for the received fax image data and that for the Internet-fax data used at the internal terminal are the same as each other on their encoding modes, data from the code detector 6 is supplied to the Internet-fax data generator 18 with no specific processing. On the contrary, when the encoding modes are different, data subjected to usual decoding/encoding is supplied to the Internet-fax data generator 18.

The basic principle of the image communications system is involved in the first to the third embodiments described above. Disclosed below in detail are Internet fax machines according to fourth to six embodiments, which are more detailed embodiments involving the basic principle.

Figure 4:
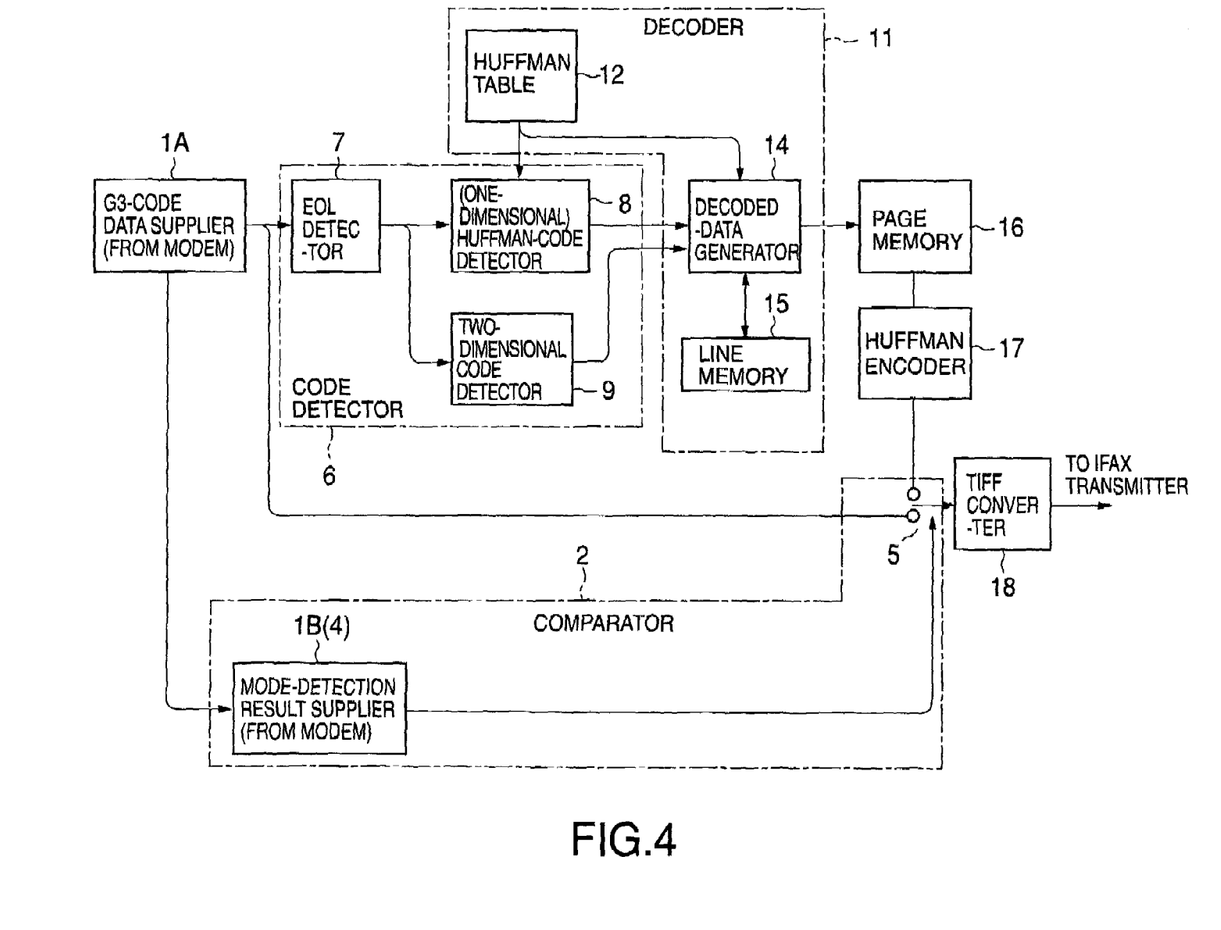
FIG. 4 shows a block diagram of a fourth embodiment of an Internet fax machine, as a further detailed embodiment according to the present invention.

FIG. 4 shows a block diagram of a fourth embodiment of an Internet fax machine. Elements shown in FIG. 4 that are the same as or analogous to the elements shown in FIG. 1 are referenced by the same reference numbers and will not be explained in detail. Supplied to the Internet fax machine in FIG. 4 from a modem as the receiver 1 via a G3-code data supplier 1A and a mode-detection result supplier 1B are G3-code data and a mode-detection result, respectively. The two suppliers 1A and 1B may be provided in the receiver 1. Or, the detector 4 shown in FIG. 1 can play a role of the mode-detection result supplier 1B.

The Internet fax machine shown in FIG. 4 is further equipped with an EOL (End of Line) detector 7 for detecting line segments for received G3 data, a one-dimensional Huffman-code detector 8 and a two-dimensional code detector 9 for detecting one- and two-dimensional Huffman codes, respectively, from the line segment-detected G3 data, a Huffman table 12 for storing the detected Huffman codes, a decoded-data generator 14, a line memory 15, a page memory 16, a Huffman encoder 17, a data switch 5, and a TIFF converter 18. A transmitter, an internal Internet terminal, etc., are not shown for brevity.

The Internet fax machine according to the fourth embodiment is explained in accordance with its relation to the image communications system according to the first embodiment as follows: The mode-detection result supplier 1B(4) and the data switch 5 constitute the comparator 2. The EOL detector 7 and the (one-dimensional) Huffman-code detector 8 and the two-dimensional code detector 9 constitute the code detector 6. The Huffman table 12, the decoded-data generator 14 and the line memory 15 constitute the decoder 11.

Figure 5:
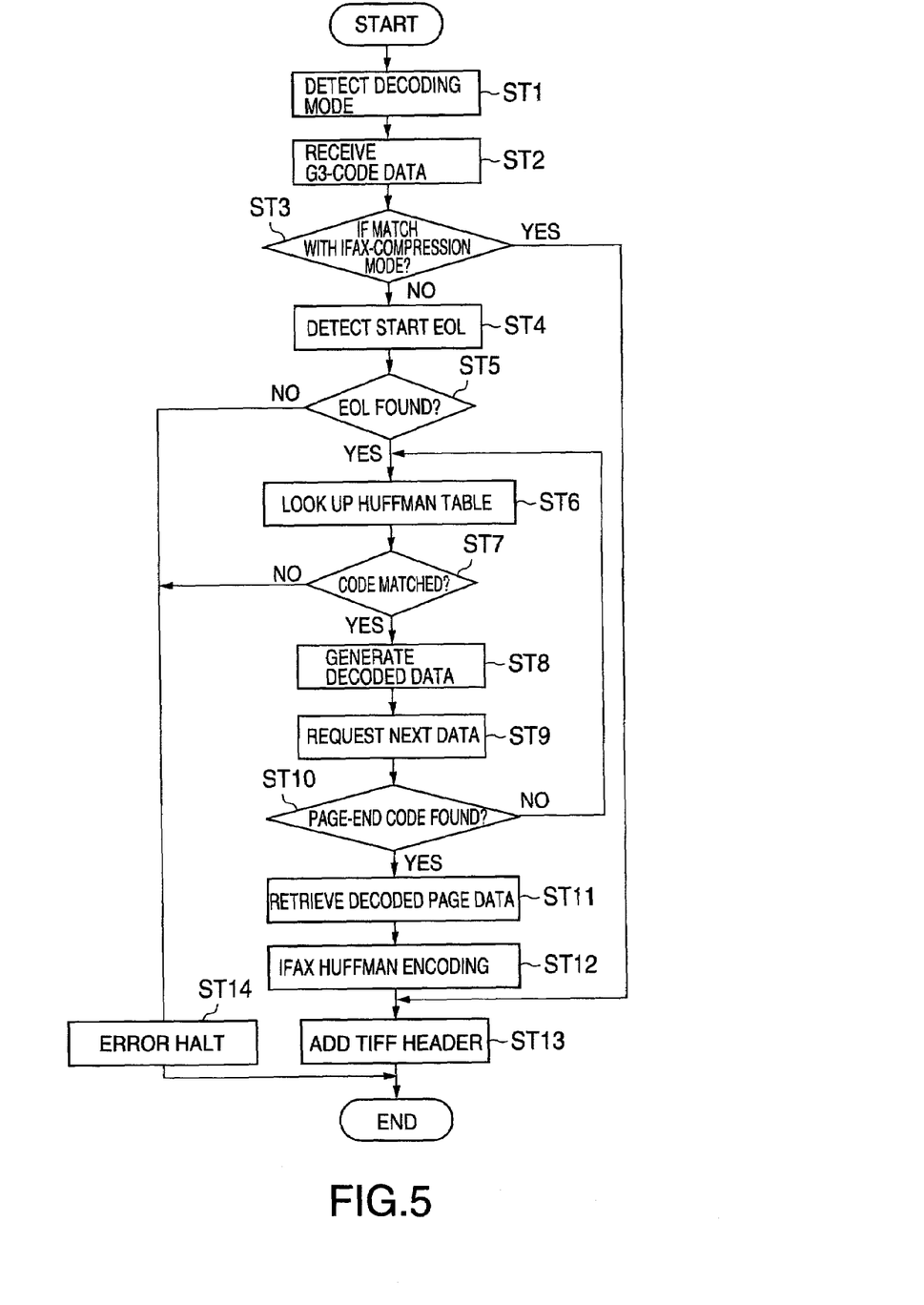
FIG. 5 shows a flowchart indicating an operation of the Internet fax machine according to the fourth embodiment in FIG. 4.

An operation of the Internet fax machine according to the fourth embodiment in FIG. 4 is disclosed with reference to a flowchart shown in FIG. 5. A decoding mode is detected (step ST1), and G3-code data is received via a modem, etc., not shown in FIG. 4 (step ST2). It is determined whether or not a compression mode for the received fax image data and that for an Internet fax machine as an internal terminal of this image communications system match each other (step ST3). If not matched, the EOL detector 7 starts EOL detection (step ST4), and it is determined whether or not the EOL code has been found (step ST5).

When it is determined that the EOL code has been found, it is further determined whether there are any codes, carried with the received fax image data, identical to those on the Huffman table 12 (step ST7). The decoded-data generator 14 generates decoded data when it is determined that there are codes identical to those on the Huffman table 12 (step ST8). The succeeding fax image data are requested one by one (step ST9) and then data decoded by the decoded-data generator 14 are transmitted reciprocally between the line memory 15 with determination of whether a page-end code has been found (step ST10).

The received and decoded fax image data are stored in the page memory 16 per page when the page-end code has been found. The decoded fax image data stored in the page memory 16 per page are retrieved therefrom (step ST11), and converted into Huffman-code data by the Huffman encoder 17 for Internet facsimile (step ST12). A TIFF code such as a header is added to the Huffman-code data by the TIFF converter 18 (step ST13). The TIFF-added Huffman-code data is supplied to an Internet-fax transmitter.

If no EOL code has been found in step ST5, the procedure goes to step ST14 and ends based on the decision that an error must have occurred in the procedure. Moreover, when it is determined in step ST7 that there are no codes in the received fax image data, that match those on the Huffman table 12, the procedure also goes to step ST14 and ends based on the decision that an error must have occurred in the procedure. The most unique operation in the fourth embodiment is the steps that follow the decision step in step ST3 in which it is determined whether there is a match on ending mode between the received fax image data and the Internet-fax data used at an internal terminal. In detail, if not matched, the decoded image is encoded again in the encoding mode for Internet facsimile whereas, if matched, the procedure jumps onto step ST13, thus avoiding a complex procedure of decoding and re-encoding.

In FIG. 4, a switching operation of the data switch 5 offers the route from the G3-code data supplier 1A to the data switch 5, not the route from the code detector 6, decoder 11, page memory 16 and Huffman encoder 17 (steps ST4 to ST12 in FIG. 5), the data-supplying route being switched in accordance with the mode-detection result. The operation of the Internet fax machine according to the fourth embodiment is completed as disclosed. The Internet fax machine in the fourth embodiment corresponds to the image communications system in the first embodiment.

Figure 6:
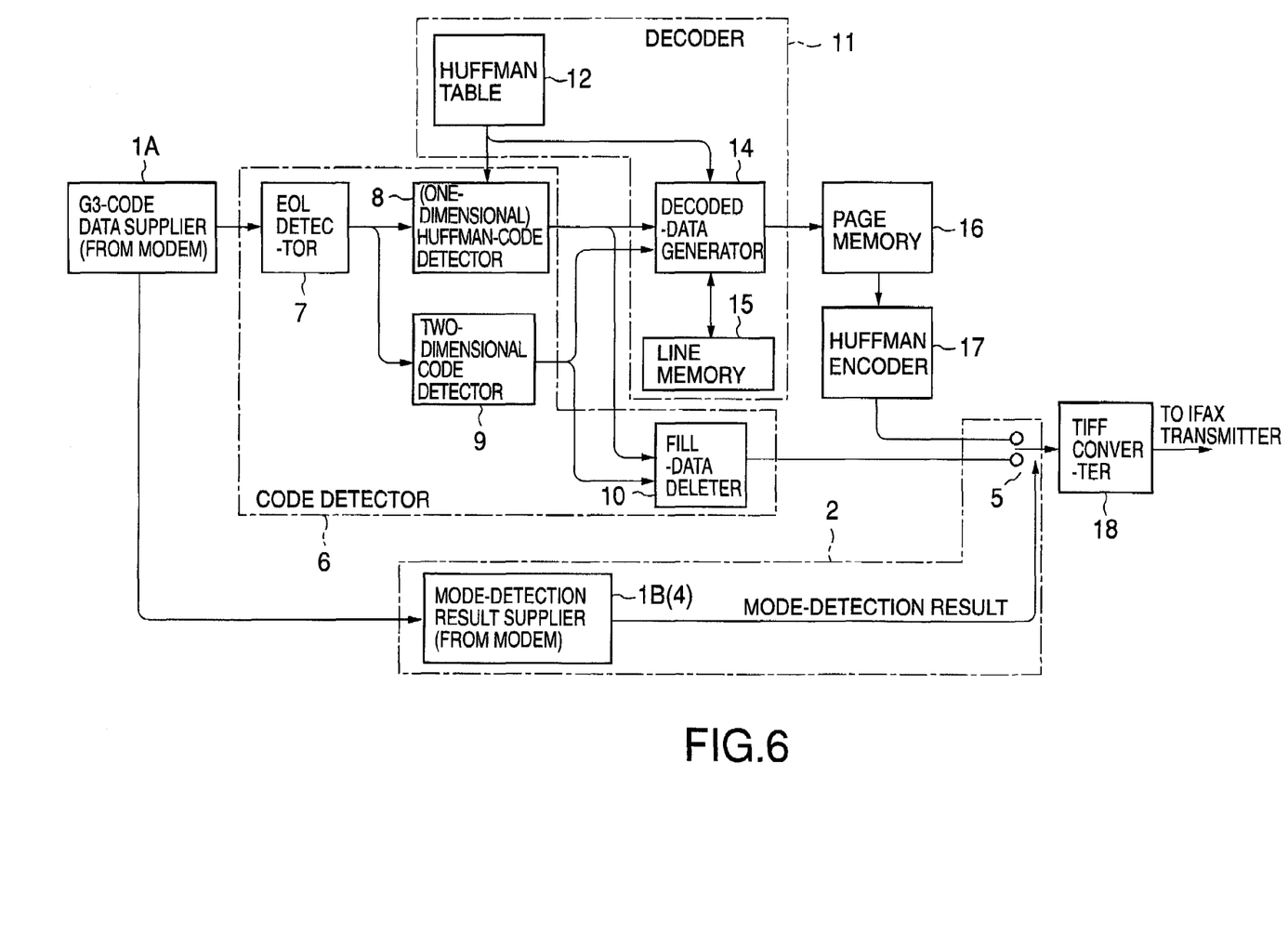
FIG. 6 shows a block diagram of a fifth embodiment of an Internet fax machine, as a further detailed embodiment according to the present invention.
Figure 7:
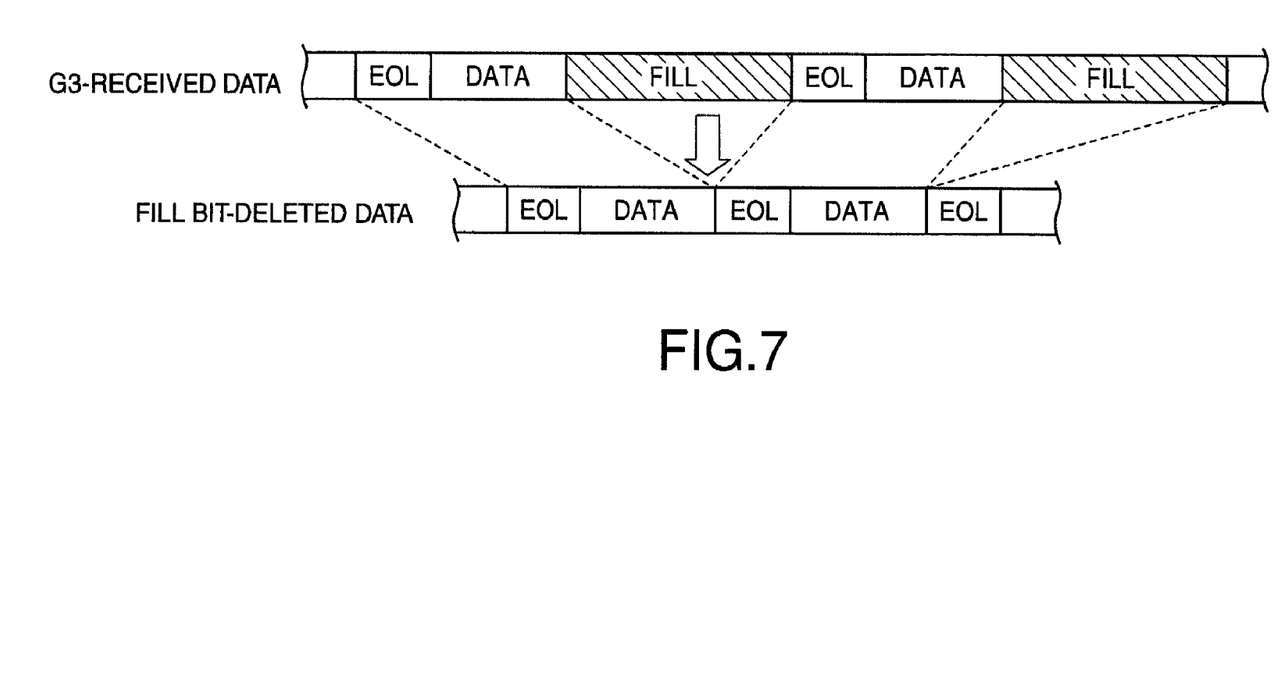
FIG. 7 shows an illustration of a data format including fill bits to be used at the Internet fax machine according to the fifth embodiment in FIG. 5.
Figure 8:
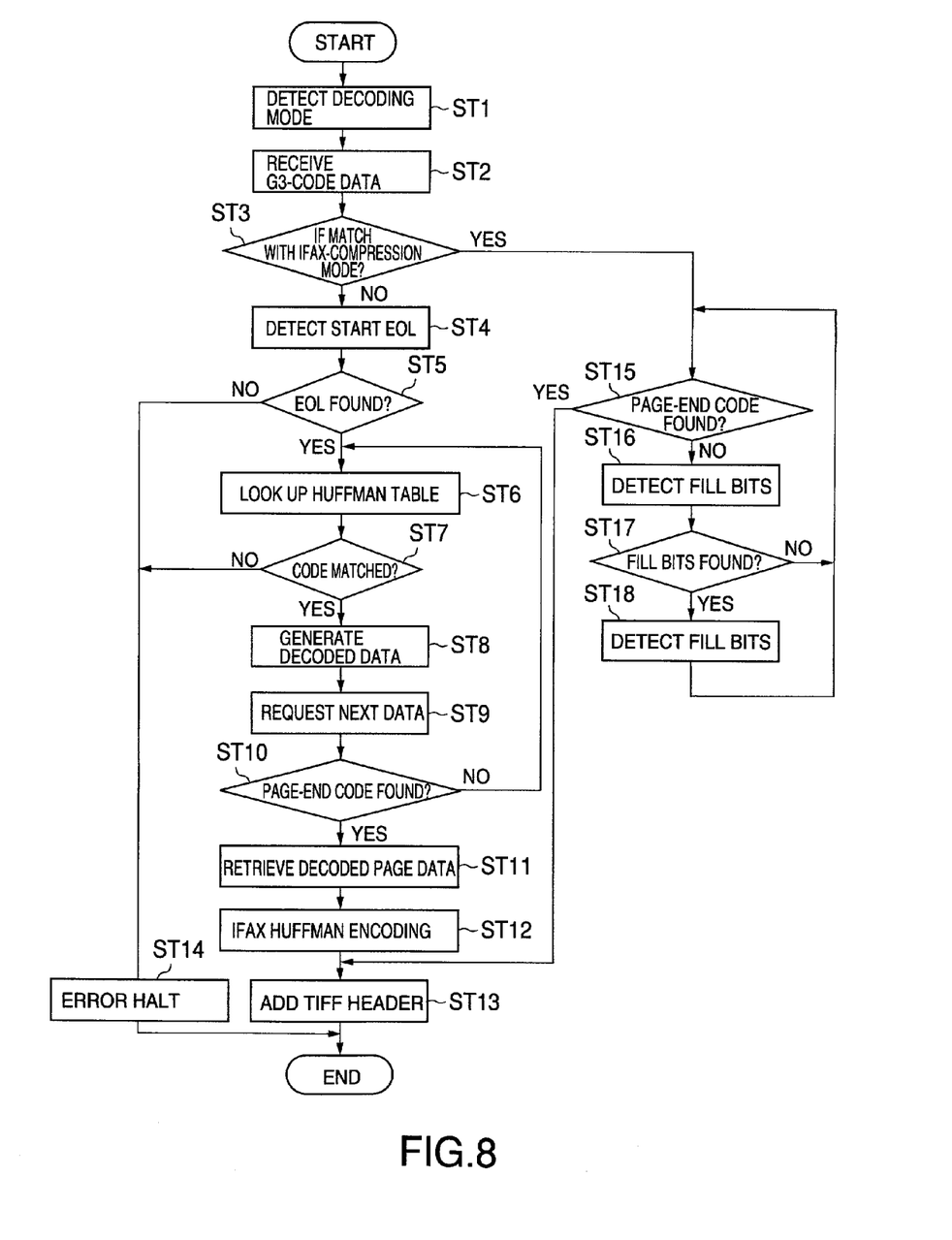
FIG. 8 shows a flowchart indicating an operation of the Internet fax machine according to the fifth embodiment in FIG. 6.

Disclosed next with reference to FIGS. 6 to 8 is an Internet fax machine according to the fifth embodiment for generating coded data for Internet facsimile with deletion of fill-bit data as a specific code that is required not for Internet-fax data but fax image data as discussed in the image communications system in the second and the third embodiments.

Elements shown in FIG. 6 that are the same as or analogous to the elements in the second and third embodiments of the image communications system are referenced by the same reference numbers. There are three differences between the Internet fax machines shown in FIG. 6 and FIG. 4 as follows: The former machine has a fill-data deleter 10. The outputs of the Huffman-code detector 8 and the two-dimensional code detector 9 are supplied to the fill-data deleter 10. And, the output of the fill-data deleter 10 is supplied to one of the switching terminals of the data switch 5. The Internet fax machine according to the fifth embodiment is a detailed embodiment corresponding to the image communications system according to the third embodiment shown in FIG. 3. The fill-data deleter 10 corresponds to the code detector 6.

Fill data handled in the fifth embodiment corresponds the specific code discussed in the second and third embodiments. The fill data is a stuff data added to fax image data if one-line data is less than a predetermined amount so that transmission of one-line image data may take 2 seconds or more but less than 5 seconds. A data format including fill bits is illustrated in FIG. 7. This data format is used for G3 data to be received, arranged in which are EOL (End of Line) codes, one-line data segments, each followed by data (DATA), fill data (FILL) and again an EOL code that is a segment between the data and the succeeding data.

As illustrated in the lower part of FIG. 7, data processed by the fill-data deleter 10 shown in FIG. 6 has a data format in which image data (DATA) only is interposed between two segment codes EOL. It is clear from the data formats shown in the upper and lower parts of FIG. 7 that a data amount is drastically decreased in the lower data format by the amount of fill data exaggerated in thick color. The Internet fax machine according to the fifth embodiment achieves reduction of data to be transmitted to Internet facsimile using coded data for which fill data (specific code) have been deleted like the second and third embodiments.

An operation of the Internet fax machine according to the fifth embodiment is disclosed with a flowchart shown in FIG. 8. Steps in this embodiment that are the same as or analogous to the steps in the fourth embodiment disclosed with reference to FIG. 5 are referenced by the same reference numbers and will not be explained in detail.

In FIG. 8, a major procedure from step ST1 for decoding-mode detection to step ST13 for TIFF-header addition is the same as the Internet fax machine according to the fifth embodiment. Hence, only different steps will be disclosed. In FIG. 5, it is determined whether there is a match on encoding mode between fax image data received in step ST3 and Internet-fax data to be transferred for use in this system. If matched, the procedure jumps onto step ST13, with no decoding, for addition of TIFF header to the fax image data before transmitted to the Internet facsimile.

On the contrary, in the operation of the Internet fax machine according to the fifth embodiment shown in FIG. 8, steps ST15 to ST18 for detection and deletion of fill-bit data are added between steps ST3 and step ST13. In detail, when it is determined in step ST3 of FIG. 8 that there is a match on encoding mode between the received fax image data and Internet fax machine as the terminal of this system, the procedure goes to step ST15 to determine whether a page-end code has been found. If found, the procedure returns to the regular operation in step ST13.

On the contrary, If no page-end code has been found in step ST15, fill bits are detected by the one- and two-dimensional code detectors 8 and 9 (step ST16), and it is determined whether fill bits have been found (step ST17). If found, the fill-bit data is deleted by the fill-data deleter 10 shown in FIG. 6 (step ST18). The procedure returns to step ST15 to determine again whether a page-end code has been found. The procedure from steps ST15 to ST 18 will be repeated until a page-end code has been found.

The Internet fax machine in the fifth embodiment is a detailed embodiment corresponding to the image communications system in the third embodiment. A detailed sixth embodiment corresponding to the image communications system in the second embodiment is not disclosed in this specification. It is however easy for skilled in the art to conceive such sixth embodiment from FIGS. 4 and 6, which will be a detailed embodiment corresponding to the image communications system in the second embodiment. Although not shown, an arrangement in FIG. 6 in which the data switch 5 is provided with three switching terminals, one of which is connected to the G3-code supplying line connected between the G3-code data supplier 1A to the data switch 5 in FIG. 4 offers a detailed embodiment corresponding to the second embodiment.

As disclosed above, in the image communications system according to the present invention, a received fax image data is added format data to be used for Internet-fax data and supplied to an internal terminal when there is a match on encoding mode between the received fax image data and the Internet-fax data to be used at the internal terminal. This eliminates decoding and re-encoding of coded data in the system, thus achieving less operation load to the system. Moreover, deletion of specific code data for example fill bits from fax image data such as G3-fax image data decreases file capacity for data transmission to an in-system Internet fax terminal, thus achieving a high transmission efficiency.

What is claimed is:

1. An image communications system for receiving fax image data encoded with a specific facsimile data format and carrying transmission codes having no relation with image contents, converting the received fax image data into Internet-fax data in a specific format, and transferring the Internet-fax data to an Internet terminal as an in-system terminal, the system comprising:

a receiver to receive the fax image data supplied via a regular communications network;

a comparator to compare an encoding mode for the received fax image data and an encoding mode for the Internet-fax data for the Internet terminal;

a converter to add format data for the Internet-fax data to the fax image data with no decoding of the fax image data if there is a match in the comparison, for converting the format data-added fax image data into the Internet fax data; and a transmitter to transmit the converted Internet fax data to the Internet terminal;

wherein said comparator includes:

a mode comparator to compare the encoding mode for the received fax image data and an encoding mode for the Internet-fax data to be used at the in-system Internet terminal;

a detector to detect whether or not there is a match between the encoding mode for the received fax image data and the encoding mode for the Internet-fax data; and a data switch to output the fax image data to the converter if there is a match in a comparison result at the detector and to output the Internet-fax image data generated in the system to the converter if there is no match.

2. The image communications system according to claim 1, further comprising a code detector to detect codes of the fax image data supplied via the code comparator of the comparator, wherein the code detector includes:

a line-segment detector to detect a segment of the fax image data per line; and a one- and two-dimensional code detector to compare the segment-detected fax image data with Huffman codes on a Huffman table, to detect one- and two-dimensionally Huffman codes of the segment-detected fax image data.

3. The image communications system according to claim 2 further comprising:

a decoder to decode the segment-detected fax image data with Huffman codes stored on the Huffman table corresponding to an output of the one- and two-dimensional code detector, for generating the Internet-fax data in the system; and an encoder to encode the decoded fax image data in the encoding mode for the in-system Internet terminal, wherein the decoder includes the Huffman table and a decoding executer having a decoded-data generator to generate decoded data per line with Huffman codes, on the Huffman table, corresponding to the output of the one- and two-dimensional code detector and a line memory to store the data decoded per line, a page memory being interposed between the decoder and the encoder, the page memory storing, per page, the decoded data output from the decoder and supplying the decoded data per page to the encoder.

4. The image communications system according to claim 1, wherein the converter includes an Internet-fax data generator to output the fax image data to the converter if there is a match at the detector of the comparator between the encoding mode for the received fax image data and the encoding mode for the Internet-fax data whereas, if there is no match, add format data for the Internet-fax data to data output from the data switch, the output data carrying image contents for Internet facsimile.

5. The image communications system according to claim 1, wherein the comparator includes:

a supplier to supply a comparison result of comparing an encoding mode for fax image data supplied from a modem and an encoding mode for in-system Internet-fax data to the converter; and a switch to switch G3- compatible code data supplied from the modem and Internet-fax image data encoded for an in-system terminal, having an input terminal for receiving the fax image data, another input terminal for receiving the Internet-fax image data, and a movable contact for switching the data at the two input terminals based on a result of the mode comparison, and the converter includes a TIFF converter, in response to either the fax image data or the Internet-fax image data switched by the switch, to add TIFF data that is format data for the Internet-fax data to either the fax image data or the Internet-fax image data, thus generating the Internet-fax data.

6. The image communications system according to claim 1, wherein the comparator includes:

a mode comparator to compare the encoding mode for the received fax image data and an encoding mode for the Internet-fax data to be used at the in-system Internet terminal;

a detector to detect whether or not there is a match between the encoding mode for the received fax image data and the encoding mode for the Internet-fax data; and a data switch to output the fax image data to the converter if there is a match in a comparison result at the detector whereas to output the Internet-fax image data generated in the system to the converter if there is no match, the system further comprises a code detector to detect codes of the fax image data supplied via the code comparator of the comparator, the code detector including:

a line-segment detector to detect a segment of the fax image data per line; and a one- and two-dimensional code detector to compare the segment-detected fax image data with Huffman codes on a Huffman table, for one- and two-dimensionally detecting Huffman codes of the segment-detected fax image data, the system further comprises a specific-code deleter to detect and delete a specific code added to the fax image data for smooth transmission via facsimile, the specific code having no direct relation with images, for outputting specific code-deleted fax image data, and the data switch of the comparator selects the fax image data supplied from the receiver, the internet-fax image data encoded in the encoding mode for the in-system Internet terminal or the specific code-deleted fax image data output from the specific-code deleter, the selected image data being output to the converter.

7. The image communications system according to claim 6 further comprising:
- a decoder to decode the segment-detected fax image data with Huffman codes stored on the Huffman table corresponding to an output of the one- and two-dimensional code detector, for generating the Internet-fax data in the system; and
- an encoder to encode the decoded fax image data in the encoding mode for the in-system Internet terminal,
- wherein the decoder includes the Huffman table and a decoding executer having a decoded-data generator to generate decoded data per line with Huffman codes, on the Huffman table, corresponding to the output of the one- and two-dimensional code detector and a line memory to store the data decoded per line, a page memory being interposed between the decoder and the encoder, the page memory storing, per page, the decoded data output from the decoder and supplying the decoded data per page to the encoder.

8. The image communications system according to claim 6, wherein the converter includes an Internet-fax data generator to output the fax image data to the converter if there is a match at the detector of the comparator between the encoding mode for the received fax image data and the encoding mode for the Internet-fax data whereas, if there is no match, adding format data for the Internet-fax data to data output from the data switch, the output data carrying image contents for Internet facsimile.

9. The image communications system according to claim 6, wherein the comparator includes:
- a supplier to supply a comparison result of comparing an encoding mode for fax image data supplied from a modem and an encoding mode for in-system Internet-fax data to the converter; and
- a switch to switch G3- compatible code data supplied from the modem and Internet-fax image data encoded for an in-system terminal, having an input terminal for receiving the fax image data, another input terminal for receiving the Internet-fax image data, and a movable contact for switching the data at the two input terminals based on a result of the mode comparison, and
- the converter includes a TIFF converter, in response to either the fax image data or the Internet-fax image data switched by the switch, to add TIFF data that is format data for the Internet-fax data to either the fax image data or the Internet-fax image data, thus generating the Internet-fax data.

10. The image communications system according to claim 1, wherein the fax image data has been encoded by a G3-mode compatible encoding technique.

11. The image communications system according to claim 10, wherein the specific code having no relation with image contents are fill bits that have been added to the encoded data per line, depending on necessity.

12. The image communications system according to claim 10, wherein the G3- mode compatible encoding technique is modified Huffman (MH) encoding, modified READ (MR) encoding, modified-modified READ (MMR) encoding or joint bi-level image experts group (JBIG) encoding.

13. The image communications system according to claim 10, wherein the format data for the Internet-fax data includes data in a tag image file format (TIFF) that defines an attribute of the image data with information including a tag.

14. An image communications system for receiving fax image data encoded with a specific facsimile data format and carrying transmission codes having no relation with image contents, converting the received fax image data into Internet-fax data in a specific format, and transferring the Internet-fax data to an Internet terminal as an in-system terminal, the system comprising:
- a receiver to receive the fax image data supplied via a regular communications network;
- a comparator to compare an encoding mode for the received fax image data and an encoding mode for the Internet-fax data for the Internet terminal;
- a code detector, based on the encoded data for which the encoding mode has been compared, to detect a specific code from a specific encode data, the specific code having no relation with image contents, and delete the detected specific code with no decoding of another code; and
- a converter to add format data for the Internet-fax data to the fax image data with no decoding of the fax image data if there is a match in the comparison, for converting the format data-added fax image data into the Internet fax data; and
- a transmitter to transmit the converted Internet fax data to the Internet terminal;
- wherein said comparator includes:
- a mode comparator to compare the encoding mode for the received fax image data and an encoding mode for the Internet-fax data to be used at the in-system Internet terminal;
- a detector to detect whether or not there is a match between the encoding mode for the received fax image data and the encoding mode for the Internet-fax data; and
- a data switch to output the fax image data to the converter if there is a match in a comparison result at the detector and to output the Internet-fax image data generated in the system to the converter if there is no match.

15. The image communications system according to claim 14 further comprising a code detector to detect codes of the fax image data supplied via the code comparator of the comparator, the code detector including:
- a line-segment detector to detect a segment of the fax image data per line;
- a one- and two-dimensional code detector to compare the segment-detected fax image data with Huffman codes on a Huffman table, for one- and two-dimensionally detecting Huffman codes of the segment-detected fax image data; and
- a specific-code deleter, based on outputs of the one- and two-dimensional code detector, to detect and delete a specific code added to the fax image data for smooth transmission via facsimile, the specific code having no direct relation with images, for outputting specific code-deleted fax image data, and
- the comparator including:
- a supplier to supply a comparison result of comparing an encoding mode for fax image data supplied from a modem and an encoding mode for in-system Internet-fax data to the converter; and
- a switch to switch G3- compatible code data supplied from the modem and Internet-fax image data encoded for an in-system terminal, having an input terminal for receiving the fax image data, another input terminal for receiving the Internet-fax image data, and a movable contact for switching the data at the two input terminals based on a result of the mode comparison, and
- the converter including a TIFF converter, in response to either the fax image data or the Internet-fax image data switched by the switch, to add TIFF data that is format data for the Internet-fax data to either the fax image data or the Internet-fax image data, thus generating the Internet-fax data.

16. The image communications system according to claim 14, wherein the fax image data has been encoded by a G3-mode compatible encoding technique.

17. The image communications system according to claim 16, wherein the G3- mode compatible encoding technique is modified Huffman (MH) encoding, modified READ (MR) encoding, modified-modified READ (MMR) encoding or joint bi-level image experts group (JBIG) encoding.

18. The image communications system according to claim 16, wherein the fax image data encoded by the G3- mode compatible encoding technique includes at least one EOL code, data related to the image contents and fill-bit data.

19. The image communications system according to claim 16, wherein the format data for the Internet-fax data includes data in a tag image file format (TIFF) that defines an attribute of the image data with information including a tag.

* * * * *